US008924307B2

(12) United States Patent
Han et al.

(10) Patent No.: US 8,924,307 B2
(45) Date of Patent: Dec. 30, 2014

(54) DOCUMENT AUTHENTICATION USING ELECTRONIC SIGNATURE

(76) Inventors: Shocky Han, Gyeonggi-do (KR); Pon Chun Ku, Seoul (KR)

( * ) Notice: Subject to any disclaimer, the term of this patent is extended or adjusted under 35 U.S.C. 154(b) by 1244 days.

(21) Appl. No.: 12/506,988

(22) Filed: Jul. 21, 2009

(65) Prior Publication Data

US 2010/0023758 A1 Jan. 28, 2010

(30) Foreign Application Priority Data

Jul. 23, 2008 (KR) ........................ 10-2008-0071887

(51) Int. Cl.
*G06F 21/10* (2013.01)
*H04L 9/32* (2006.01)
*G06F 21/64* (2013.01)

(52) U.S. Cl.
CPC ............ *H04L 9/3263* (2013.01); *G06F 21/645* (2013.01); *H04L 9/3247* (2013.01)
USPC ............... 705/59; 705/51; 713/176; 713/168; 713/156

(58) Field of Classification Search
USPC ................. 705/64, 51, 59; 713/175, 176, 168
See application file for complete search history.

(56) References Cited

U.S. PATENT DOCUMENTS

| 3,983,535 | A | * | 9/1976 | Herbst et al. | 382/122 |
|---|---|---|---|---|---|
| 4,868,877 | A | * | 9/1989 | Fischer | 713/157 |
| 5,175,681 | A | * | 12/1992 | Iwai et al. | 705/7.12 |
| 5,606,609 | A | * | 2/1997 | Houser et al. | 713/179 |
| 5,680,470 | A | * | 10/1997 | Moussa et al. | 382/119 |
| 5,748,738 | A | * | 5/1998 | Bisbee et al. | 713/176 |
| 5,825,880 | A | * | 10/1998 | Sudia et al. | 713/180 |
| 5,956,409 | A | * | 9/1999 | Chan et al. | 380/54 |
| 6,091,835 | A | * | 7/2000 | Smithies et al. | 382/115 |
| 6,185,683 | B1 | * | 2/2001 | Ginter et al. | 713/176 |
| 6,209,095 | B1 | * | 3/2001 | Anderson et al. | 713/176 |
| 6,327,656 | B2 | * | 12/2001 | Zabetian | 713/176 |
| 6,367,013 | B1 | * | 4/2002 | Bisbee et al. | 713/178 |
| 6,757,826 | B1 | * | 6/2004 | Paltenghe | 713/170 |
| 6,796,489 | B2 | * | 9/2004 | Slater et al. | 235/379 |
| 6,990,585 | B2 | * | 1/2006 | Maruyama et al. | 713/176 |
| 7,024,562 | B1 | * | 4/2006 | Flink et al. | 713/186 |
| 7,069,443 | B2 | * | 6/2006 | Berringer et al. | 713/180 |
| 7,249,258 | B2 | * | 7/2007 | Honda et al. | 713/176 |
| 7,310,732 | B2 | * | 12/2007 | Matsuyama et al. | 713/176 |

(Continued)

FOREIGN PATENT DOCUMENTS

| KR | 2002-0012321 | 2/2002 |
|---|---|---|
| KR | 10-0797735 | 1/2008 |
| WO | WO 01/08031 A1 | 2/2001 |

*Primary Examiner* — Mamon Obeid
(74) *Attorney, Agent, or Firm* — David B. Tingey; Bryant J. Keller; Kirton McConkie (57) ABSTRACT

Embodiments of authenticating an electronic document are disclosed. A document authentication system is operatively connected with a professional system, a license management system and a certification authority system, for authenticating an electronic document of a client response to a request from a client system. An authentication unit included in the document authentication system receives the electronic document from the client system for review and seal thereof, transmits the electronic document to receive the electronic document with the electronic signature implemented and transmits the electronic signature to the license management system to verify license validity of the professional based on the electronic signature. Further, the authentication unit transmits the electronic document to the client system with the electronic signature including a seal imprint image of the professional if the license of the professional is valid.

7 Claims, 7 Drawing Sheets

(56) References Cited

U.S. PATENT DOCUMENTS

| | | | |
|---|---|---|---|
| 7,360,079 B2* | 4/2008 | Wall | 713/155 |
| 7,409,553 B2* | 8/2008 | Kumagai et al. | 713/175 |
| 7,502,934 B2* | 3/2009 | Dietl | 713/176 |
| 7,533,269 B2* | 5/2009 | Kumagai et al. | 713/176 |
| 7,536,712 B2* | 5/2009 | Kaler et al. | 726/5 |
| 7,657,604 B2* | 2/2010 | Kim et al. | 709/206 |
| 7,694,143 B2* | 4/2010 | Karimisetty et al. | 713/176 |
| 7,934,098 B1* | 4/2011 | Hahn et al. | 713/176 |
| 7,996,677 B2* | 8/2011 | Charles et al. | 713/175 |
| 8,375,216 B2* | 2/2013 | Mizuno | 713/176 |
| 8,386,793 B2* | 2/2013 | Wang et al. | 713/180 |
| 8,433,909 B1* | 4/2013 | Sakkos et al. | 713/170 |
| 8,526,608 B2* | 9/2013 | Song et al. | 380/55 |
| 8,528,097 B2* | 9/2013 | Ginter et al. | 726/26 |
| 8,667,290 B2* | 3/2014 | Appelbaum et al. | 713/176 |
| 8,793,499 B2* | 7/2014 | Loughry | 713/176 |
| 2001/0018739 A1* | 8/2001 | Anderson et al. | 713/176 |
| 2002/0010684 A1* | 1/2002 | Moskowitz | 705/75 |
| 2002/0019937 A1* | 2/2002 | Edstrom et al. | 713/168 |
| 2002/0038290 A1* | 3/2002 | Cochran et al. | 705/50 |
| 2002/0049906 A1* | 4/2002 | Maruyama et al. | 713/176 |
| 2002/0099938 A1* | 7/2002 | Spitz | 713/155 |
| 2002/0129255 A1* | 9/2002 | Tsuchiyama et al. | 713/176 |
| 2003/0056100 A1* | 3/2003 | Beatson | 713/176 |
| 2003/0056171 A1* | 3/2003 | Yone et al. | 715/505 |
| 2003/0063744 A1* | 4/2003 | Parry | 380/51 |
| 2003/0078880 A1* | 4/2003 | Alley et al. | 705/38 |
| 2003/0128375 A1* | 7/2003 | Ruhl et al. | 358/1.6 |
| 2003/0138135 A1* | 7/2003 | Chung et al. | 382/119 |
| 2003/0217275 A1* | 11/2003 | Bentley et al. | 713/184 |
| 2004/0006692 A1* | 1/2004 | Honda et al. | 713/157 |
| 2004/0093493 A1* | 5/2004 | Bisbee et al. | 713/156 |
| 2004/0181756 A1* | 9/2004 | Berringer et al. | 715/530 |
| 2004/0236694 A1* | 11/2004 | Tattan et al. | 705/50 |
| 2005/0091521 A1* | 4/2005 | Terada et al. | 713/194 |
| 2005/0132195 A1* | 6/2005 | Dietl | 713/176 |
| 2005/0191990 A1* | 9/2005 | Willey et al. | 455/411 |
| 2005/0210256 A1* | 9/2005 | Meier et al. | 713/176 |
| 2005/0246523 A1* | 11/2005 | Mauro et al. | 713/156 |
| 2006/0156006 A1* | 7/2006 | Dietl et al. | 713/176 |
| 2007/0033400 A1* | 2/2007 | Senez, Jr. | 713/168 |
| 2008/0301453 A1* | 12/2008 | Shih et al. | 713/176 |
| 2009/0031135 A1* | 1/2009 | Kothandaraman | 713/176 |
| 2009/0077373 A1* | 3/2009 | Kramer | 713/155 |
| 2010/0031140 A1* | 2/2010 | Cummins | 715/236 |
| 2011/0296191 A1* | 12/2011 | Mouille | 713/176 |
| 2013/0185565 A1* | 7/2013 | Appelbaum et al. | 713/176 |
| 2014/0019761 A1* | 1/2014 | Shapiro | 713/176 |

* cited by examiner

DOCUMENT AUTHENTICATION USING ELECTRONIC SIGNATURE

The present application claims priority from Korean Patent Application No. 10-2008-0071887 filed on Jul. 23, 2008, the entire subject matter of which is incorporated herein by reference.

TECHNICAL FIELD

The present disclosure relates to an authentication system, and more particularly to electronic document authentication using an electronic signature of a professional.

BACKGROUND

Generally, signatures (or seals) are often required to authenticate documents such as a specification and drawings, which are prepared or reviewed by professionals such as a registered architect, a professional engineer, a patent attorney, a doctor and the like. Under conventional professional licensing systems, for example, the laws of registered architects or engineers, signatures (or seals) of professionals on paper documents are needed. In such a case, there is the problem of making unnecessary print-outs only for the purpose of signature (or seal) despite the fact that a large number of the related documents have been already stored in an electronic storage medium. Further, it is also a time-consuming process to obtain and wait for the completion of the professional's signature (or seal).

For businesses, once any change is newly made on the blueprint due to design changes, it may communicate once more with the professional who understands the original plan and is in charge of signing (or sealing) it for review. If the professional is outside of the country or he/she is participating in the other project in a distant location or his/her whereabouts are unknown, the work may require reexamination by the other professional, which will result in a significant delay in the progress of business.

In addition, there also have been some problems associated with authenticating and maintaining documents with the seals affixed thereto in terms of whether they are the latest version or they are the original/copy version of the blueprint. In other words, it is difficult to warrant that no design changes have ever been made since a professional signed or affixed seal, and that the signature (or seal) is truly valid for the corresponding printed edition.

Furthermore, a document such as an original design or a report with a signature or seal implemented in accordance with the conventional method of affixing seal does not have enough information to verify the validity of the professional's license, i.e., to check whether it is illegally lent, or it is forged or invalid at the time of verification.

Therefore, it is helpful for professionals to prove the validity of their license objectively and it is helpful for clients to verify that the signature of professionals on the electronic documents, i.e. designs and reports, is valid.

SUMMARY

Embodiments for authenticating an electronic document are disclosed. In one embodiment, by way of non-limiting example, a document authentication system operatively connected with a professional system for an electronic signature of a professional on a electronic document, and a license management system for management of licenses of professionals and a certification authority system for issuing certificates, so as to authenticate an electronic document of a client response to a request from a client system, the electronic document authentication system comprises: a communication unit operable to communicate with the client system, the professional system, the license management system and the certification authority system; and an authentication unit operable to receive the electronic document from the client system for review and seal thereof, transmit the electronic document to receive the electronic document with the electronic signature implemented and to transmit the electronic signature to the license management system to verify license validity of the professional based on the electronic signature, the authentication unit being further operable to transmit the electronic document to the client system with the electronic signature including a seal imprint image of the professional if the license of the professional is valid.

In another embodiment, a method for authenticating an electronic document with an electronic signature of a professional in a document authentication system operatively connected with a client system, a professional system for an electronic signature of a professional on a electronic document, a license management system for management of licenses of professionals and a certification authority system for issuing certificates, the method comprises: receiving an electronic document for review and seal thereof from a client system; transmitting the electronic document to the professional system for an electronic signature of a professional; transmitting the electronic signature to the license management system to verify license validity of the professional; and transmitting the electronic document with the electronic signature to the client system when the license of the professional is valid.

In another embodiment, a computer readable record media for performing instructions of authenticating an electronic document with an electronic signature of a professional in a document authentication system operatively connected with a professional system for an electronic signature of a professional on a electronic document, a license management system for management of licenses of professionals and a certification authority system for issuing certificates, for authenticating an electronic document of a client response to a request from a client system, comprises: receiving an electronic document for review and seal thereof from a client system; transmitting the electronic document to the professional system for an electronic signature of a professional; transmitting the electronic signature to the license management system to verify license validity of the professional; and transmitting the electronic document with the electronic signature to the client system when the license of the professional is valid.

The summary is provided to introduce a selection of concepts in a simplified form that are further described below in the Detailed Description. This summary is not intended to identify key or essential features of the claimed subject matter, nor is it intended to be used in determining the scope of the claimed subject matter.

BRIEF DESCRIPTION OF THE DRAWINGS

FIG. 2 is a block diagram showing an illustrative embodiment of a document authentication system shown in.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
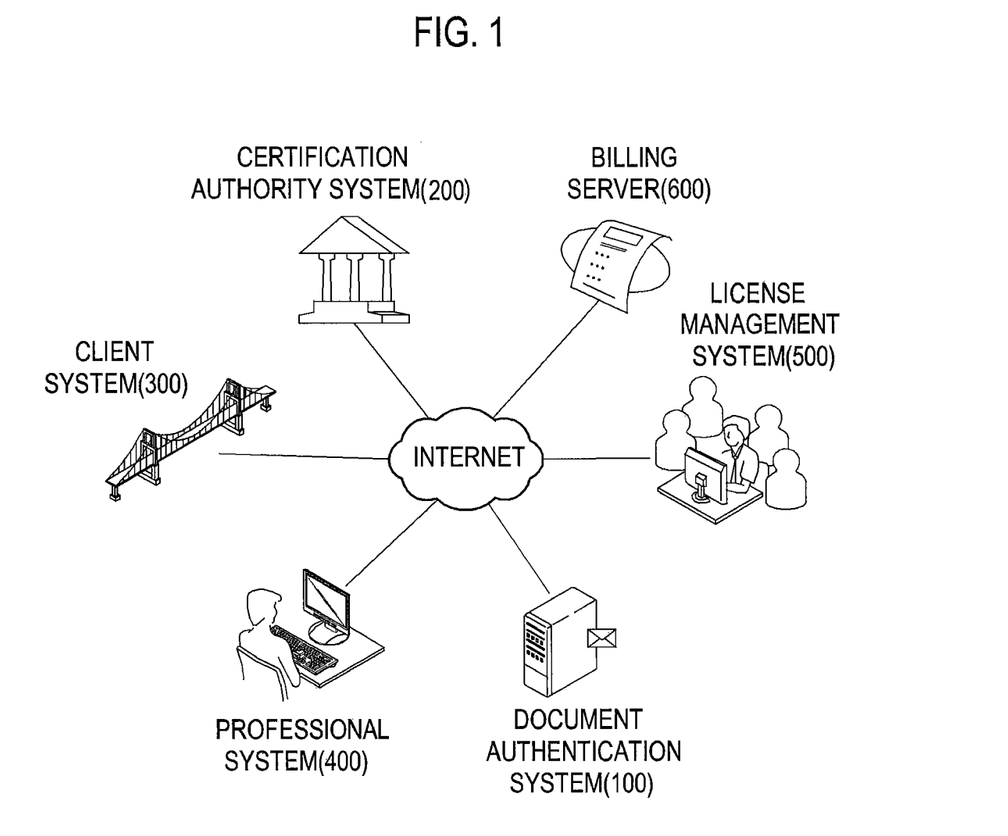
FIG. 1 is a schematic diagram showing a network configuration for document authentication.

FIG. 1 is a schematic diagram showing an illustrative embodiment of a network configuration for authentication of an electronic document. Referring to FIG. 1, a document authentication system 100 may be connected to a system 200 managed by a certification authority (CA, hereinafter, referred to as a CA system) through the Internet. The CA system 200 may be operable to perform public key infrastructure (PKI) authentication for issuing a certificate for a professional to allow the professional having a valid license to implement an electronic signature on an electronic document such as drawing, specification and the like. The professional may be a professional licensee, a registered architect, a professional engineer, a patent attorney, or a doctor., and the like. However, the professional is not limited to these specific professions, and includes any other type of profession that could benefit from verification of licenses. Also, the PKI authentication may be carried out to output additional information such as a seal imprint image, if necessary.

The electronic document authentication system 100 may be further connected to a client system 300, which is managed and operated by a client, such as a government agency, a construction company or the like. The client system 300 may be operable to transmit an electronic document to the electronic document authentication system 100 for review and seal by the professional in charge. The client system 300 may receive an acceptance of the electronic document from the professional for output.

The electronic document authentication system 100 may be further connected to a professional system 400, which is managed by the professional. In one embodiment, an electronic signature implementing program may be installed on the professional system 400, so that the professional may implement an electronic signature on an electronic document by executing the electronic signature implementing program. In one embodiment, the electronic signature may be enveloped with a seal imprint image, identification (ID) and license number of the corresponding professional.

The electronic document authentication system 100 may be further connected to a system 500 for managing licenses of the processionals (hereinafter, referred to as license management system). For example, the license management system may be a system managed by a state board, association of professionals and the like. The license management system 500 may be operable to receive the electronic signature from the professional system 400 through the electronic document authentication system 100 to verify license validity of the corresponding professional.

In one embodiment, if the license management system 500 and the electronic document authentication system 100 meets predetermined requirements of the relevant law, a private authentication system capable of issuing a private certificate may be additionally built and managed instead of accessing the CA system 100. Also, a billing server 600 may be additionally built to charge service fees.

In one embodiment, a client such as a government agency, e.g., the construction company may transmit an electronic document to the electronic document authentication system 100 using an installed program on the client system 300 for review and seal thereof. The professional in charge may be selected by the client through the electronic document authentication system 100. The professional may review the electronic document and implement an electronic signature on the electronic document based on the acceptance through the professional system 400. The electronic signature may be implemented by the execution of the electronic signature implementing program.

In one embodiment, the license management system 500 may include an internal database for storing information upon IDs and license numbers of professionals. The internal database may store most recently updated license information of professionals. The electronic signature, which was previously implemented by executing the electronic signature implementing program in the professional system 400, may be transmitted to the license management system 500. The license validity of the corresponding professional, who implements the electronic signature, may be verified by searching the internal database in the license management system 500. If the license of the professional is valid, that is, the license is not expired, the electronic signature implemented by the corresponding professional may be stored in the electronic document authentication system 100 for reference and follow-up, so that the client may easily check the electronic signatures of the professionals by accessing the electronic document authentication system 100 at any time.

In one embodiment, the seal imprint image of the professional may be processed in the electronic document authentication system 100 for preventing reuse thereof after verifying the validity of the professional license in the license management system 500. In this case, the processing of the seal imprint image may be performed to be associated with a specific serial number, bar codes or the like. In this case, the bar codes may be 2-dimensional bar codes. The seal imprint image may be transmitted to the client system 300 and then may be outputted by executing a dedicated output program installed on the client system 300. In one embodiment, the seal imprint image may be outputted only for the corresponding electronic document by the execution of the dedicated output program. Thus, it may prevent the seal imprint image from being extracted and outputted together with other documents.

In one embodiment, when the corresponding seal imprint image is optically copied or scanned for use as an output of other documents, or when the contents of the electronic document changed, the copy or the change may be recognized by all of the electronic document authentication system 100, the electronic document authentication system 100, the client system 300, the professional system 400 due to the characteristics of the electronic signature and the seal imprint image, which are processed for preventing the reuse thereof (hereinafter, referred to as reuse prevention processing).

The electronic signature may include hash values regarded as private values of the electronic document, serial numbers given by the electronic document authentication system 100 and private serial numbers assigned by the client system 300.

Figure 2:
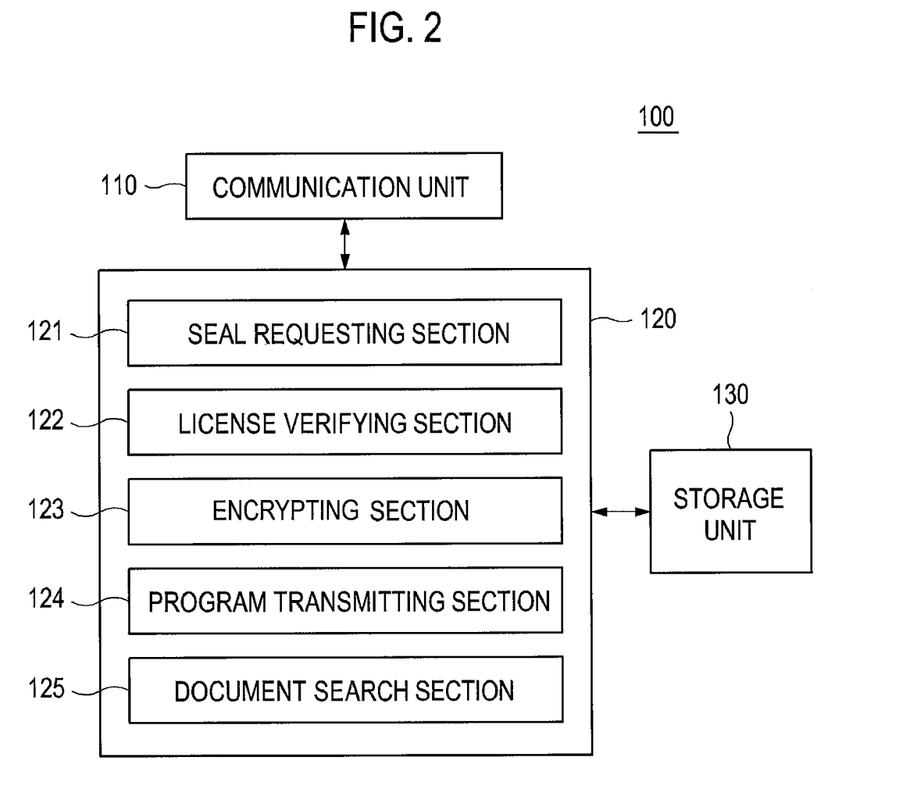

Hereinafter, an operation of the electronic document authentication system 100 will be described in detail. FIG. 2 is a block diagram showing an illustrative embodiment of the electronic document authentication system 100. Referring to FIG. 2, the electronic document authentication system 100 may include a communication unit 110. The communication unit 110 may be operable to allow the electronic document authentication system 100 to communicate with the CA system 200, the client system 300, the professional system 400 and the license management system 500 through Internet.

The electronic document authentication system 100 may further include an authentication unit 120. The authentication unit 120 may be configured to control operations of receiving an electronic document for review and seal thereof from the client system 300 and transmitting the electronic document to the professional system 400. The authentication unit 120 may receive the electronic signature of the professional from the professional system 400. The authentication unit 120 may be further operable to inquire verification license validity of the corresponding professional to the license management system 500. When it is determined that the license of the professional is valid through the verification thereof based on the electronic signature, i.e., the electronic signature is proper, the authentication unit may be operable to transmit the electronic signature to the client system 300.

The electronic document authentication system 100 may further include a storage unit 130 for storing the electronic signatures and the electronic documents corresponding thereto. The stored electronic signatures may be authenticated electronic signatures. In one embodiment, the storage unit 130 may further include a system private key.

The authentication unit 120 may include a seal request section 121. The seal request section 121 may be operable to receive the electronic document from the client system 300 through the communication unit 110. The seal request section 121 may be further operable to transmit the received electronic document to the professional system 400 for review and seal thereof. The seal request section 121 may be further receive the electronic signature implemented by the professional from the professional system 400.

The authentication unit 120 may further include a license verifying section 122. The license verifying section 122 may be operable to transmit the electronic signature to the license management system 500 to verify license validity of the corresponding professional. The license verifying section 122 may be further operable to receive the result upon the verified license validity of the corresponding professional from the license management system 500.

The authentication unit 120 may further include an encrypting section 123 that may be operable to encrypt the electronic document and the electronic signature with a system private key for preventing the reuse thereof when it is determined that the electronic signature is proper. The authentication unit 120 may further include a program transmitting section 124 that may be operable to transmit the dedicated output program, which may be stored in the storage unit 130, to the client system 300.

The authentication unit 120 may further include a document search section 125. The electronic document search section 125 may be operable to search for electronic documents from the storage unit 130 to provide an electronic document in response to a document request from the client system 300. In this case, the seal request section 121 may be operable to give an inherent serial number to each of the electronic documents according as necessary. The serial number may be used as the additional information associated with the electronic document for preventing the reuse thereof.

Figure 3:
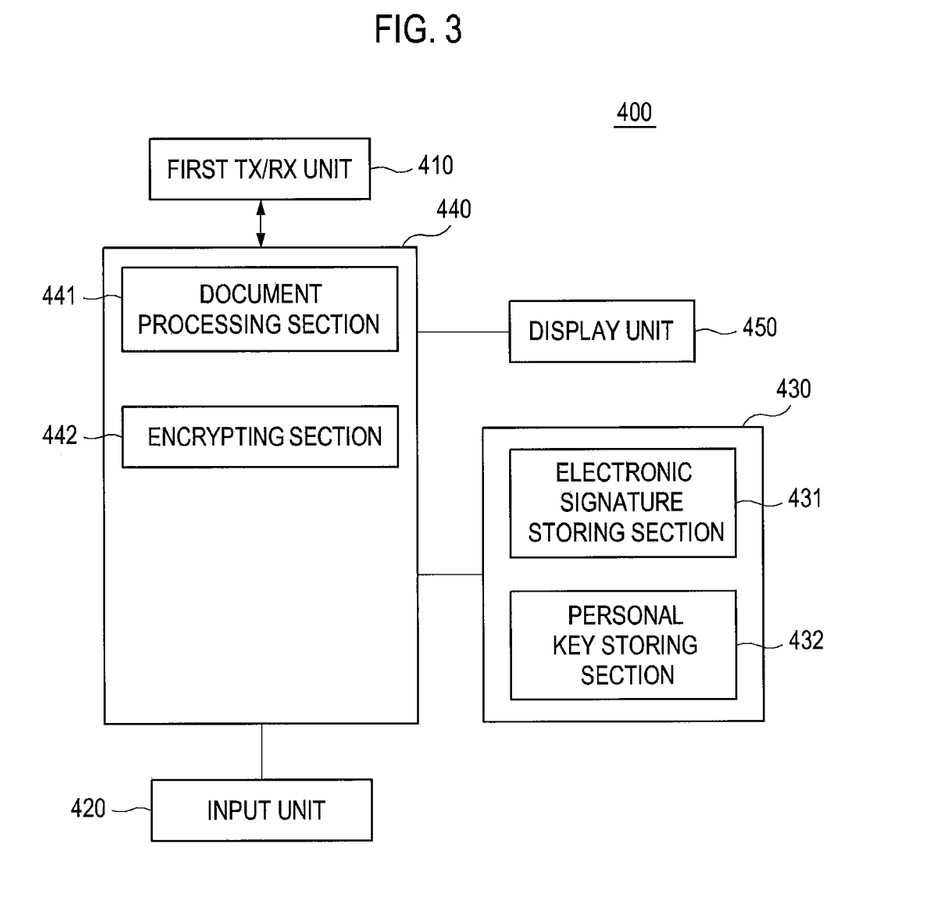
FIG. 3 is a block diagram showing an illustrative embodiment of a professional system shown in FIG. 1.

FIG. 3 is a block diagram showing an illustrative embodiment of the professional system 400 of FIG. 1. Referring to FIG. 3, the professional system 400 may include a first transmission/reception (Tx/Rx) unit 410 for communication with other systems through Internet, and an input unit 420 for allowing the professional to input a selection instruction. The professional system 400 may further include a private information storing unit 430. The private information storing unit 430 may include an electronic signature storing section 431 and a private key storing section 432. The electronic signature storing section 431 may be configured to store a private electronic signature or seal imprint image. The private key storing section 432 may be configured to store private keys such as certificates.

The professional system 400 may further include a control unit 440. The control unit 440 may include a document processing section 441 and an encrypting section 442. The electronic document processing section 441 may be operable to process the electronic document received through the first Tx/Rx unit 410 to be displayed on a display unit 450. The electronic document processing section 441 may be further operable to implement an electronic signature upon the electronic document. The encrypting section 442 may be operable to encrypt the electronic signature. The encrypted electronic signature include hash values of the electronic document, the seal imprint image, ID and license number of the professional. The encrypted electronic signature may be transmitted to the authentication unit 120 in response to an input from the input unit 420.

Figure 4:
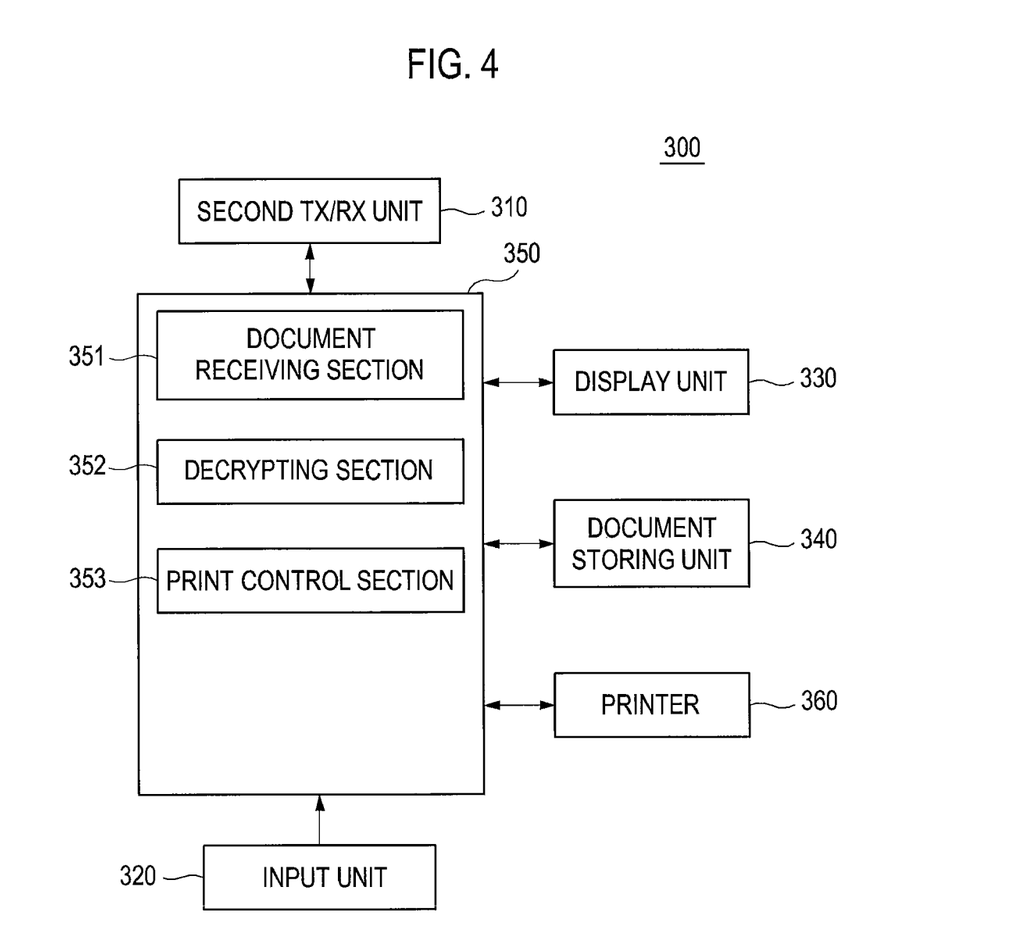
FIG. 4 is a block diagram showing an illustrative embodiment of a client system shown in FIG. 1.

FIG. 4 is a block diagram showing an illustrative embodiment of the client system 300. Referring to FIG. 4, the client system 300 may include a second transmission/reception (Tx/Rx) unit 310 for communication with other systems, and an input unit 320 that may be operable to allow the client to input a selection instruction. The client system 300 may further include a display unit 330 and a document storing unit 340. An electronic document, which is made by the client, may be stored in the electronic document storing unit 340. The client system 300 may further include a control unit 350. If a selection instruction for selecting a specific electronic document and a seal request thereof is inputted through the input unit 320, the control unit 350 may be operable to control the second Tx/Rx unit 310 to transmit the selected electronic document to the authentication unit 120. The control unit 350 may be further operable to control a printer 360 to print out the electronic document with a seal imprint image attached.

The control unit 350 may include a document receiving section 351. If the selection instruction for selection of an electronic document selection for review and seal thereof is inputted through the input unit 320, the electronic document transmitting/receiving section 351 may be operable to transmit the selected electronic document to the authentication unit 120 for requesting the review and the seal thereof, and receive the electronic document with the electronic signature and the seal imprint image. In one embodiment, the encrypted electronic document, electronic signature and seal imprint image may be received. The control unit 350 may further include a decrypting section 352 that may be operable to decrypt the encrypted electronic document, the electronic signature and seal imprint image. The control unit 350 may further include a print control section 353 that may be operable to control the printer 360 to print out the seal imprint image on the electronic document when hash values of the decrypted electronic document and electronic signature are matched with each other.

Figure 5:
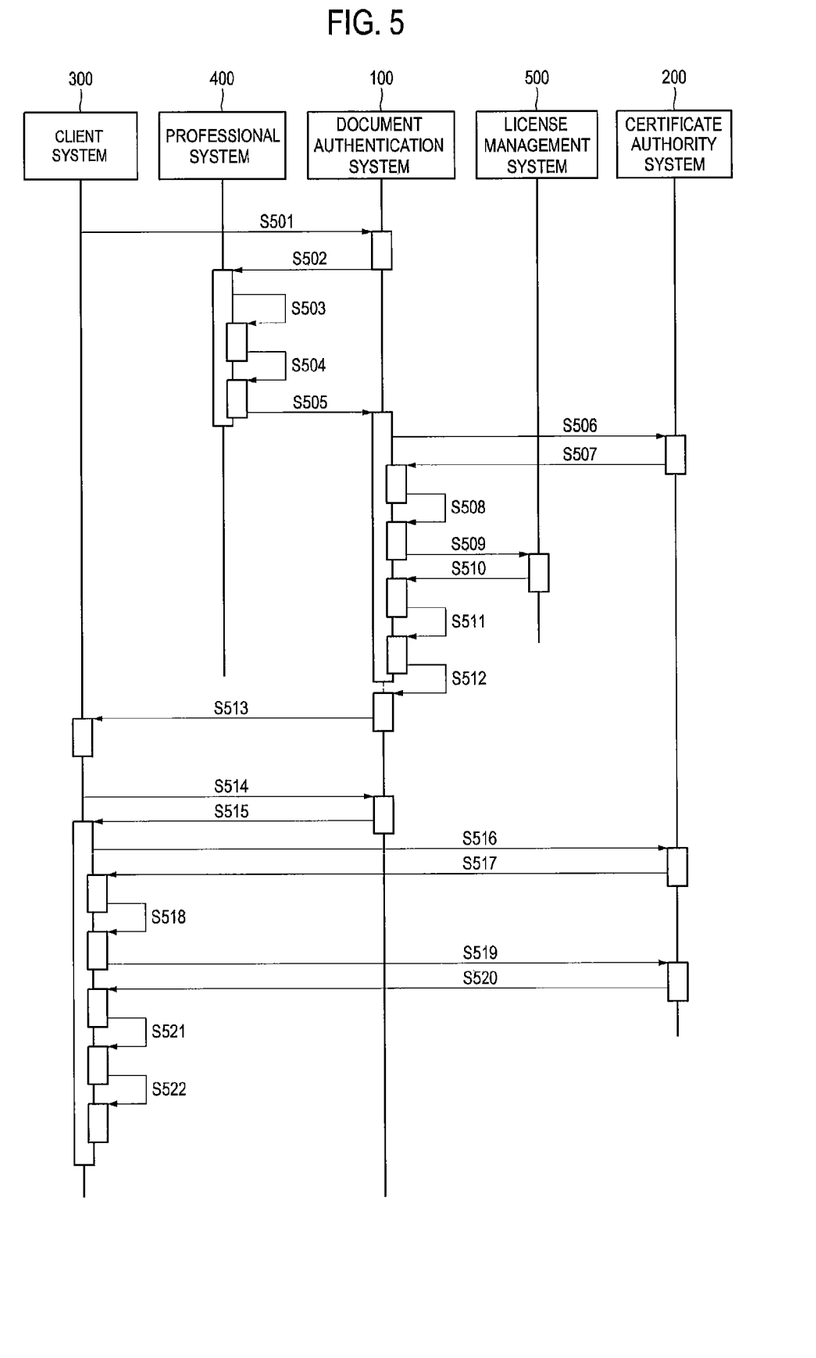
FIG. 5 showing an illustrative embodiment of a procedure for authenticating the electronic document of the client.

Hereinafter, a procedure for authenticating an electronic document will be described in detail with reference to FIG. 5 according to one embodiment. FIG. 5 showing an illustrative procedure for authenticating the electronic document of the client. Referring to FIG. 5, first, if the client may input a selection instruction for selecting an electronic document for review and seal thereof through the input unit 320, the control unit 350 may be operable to control the second Tx/Rx unit 310 to transmit the selected electronic document to the authentication unit 120 at S501.

The authentication unit 120 in the electronic document authentication system 100 may receive the electronic document for review and seal thereof from the client system 300 through the communication unit 110. The seal requesting section 121 may be operable to transmit the received electronic document to the professional system 400 for review and seal thereof at S502. The electronic document may be transmitted to the professional system 400 through the first Tx/Rx unit 410. The control unit 440 may be operable to control the display unit 330 to display the received electronic document thereon.

The professional to be charged may review the electronic document to check whether the electronic document is proper. When the electronic document is proper, the professional may accept through the input unit 420 at S503. The electronic document processing section 440 may be operable to read out an electronic signature for implementation on the electronic document and the private key from the electronic signature storing section 431 and the private key storing unit 432, respectively. The electronic signature implementing program may be executed to implement the electronic document, and the encrypting section 442 may be operable to encrypt the implemented electronic signature using the private key at S504. The encrypted electronic signature may be transmitted to the electronic document authentication system 100 for approval of the electronic signature at S505.

The electronic document authentication system 100 may be operable to request a professional public key to the CA system 120 at S506, and then receive the professional public key at S507. The license verifying section 122 in the electronic document authentication system 100 may be operable to decrypt the received electronic signature using the professional public key at S508. The license verifying section 122 may be operable to transmit the decrypted electronic signature to the license management system 500 to verify the license validity of the professional in the license management system 500 at S509. Existence and valid period of the professional license may be verified by searching the internal database of the license management system 500. The verification result for the license validity of the professional is transmitted to the electronic document authentication system 100 at S510.

If it is determined that the professional license is invalid, the authentication process may not be performed any more and the validation result is transmitted to the client system 300, so that the client may terminate the authentication process. If the professional license is valid, the encrypting section 123 may be operable to encrypt the electronic signature to prevent the reuse thereof by using the system private key stored in the storage unit 130 at S511. The encrypted electronic signature may be transmitted together with the electronic document and the seal imprint image to the client system 300 at S513.

The client system 300 may be operable to request the seal imprint output program to the authentication unit 120 after receiving the electronic document with the electronic signature implemented at S514. The program transmitting section 124 in the authentication unit 120 may be operable to provide the seal imprint output program to the client system 300 at S515. In another embodiment, the client system 300 may be operable to previously download the seal imprint output program. In this case, the step for transmission of the seal imprint output program may be omitted.

The client system 300 may be operable to request a system public key to the CA system 200 at S516, and then receive the system public key therefrom at S517. The decrypting section 352 in the control unit 350 may be operable to decrypt the encrypted electronic signature using the system public key at S518. The decrypting section 352 may be further operable to request a professional public key to the CA system 200 at S519, and then the CA system 200 may be operable to transmit the professional public key to the decrypting section 352 in response thereto at S520. The decrypting section 352 may be operable to decrypt the encrypted electronic signature at S521, and the print control section 353 may be operable to control the printer 360 to print out the electronic document and the seal imprint image thereon at S522. The print control section 353 may be further operable to control the printer 360 to print out the reuse prevention information of the seal imprint image with a 2-dimensional bar codes or an inherent serial number.

In one embodiment, although it is described that the electronic signature of the professional is completed before transmitting the electronic signature to the authentication system 100 for verifying validity of the electronic signature. However, if the electronic signature of the professional is completed after the step S507, the steps S506, S507, S508, S516, S517 and S518 may be omitted in another embodiment. In this case, after processing the seal imprint image for preventing reuse thereof, the electronic signature may be encrypted, i.e., the electronic signature may be completed.

In one embodiment, if it is verified that the license of the associated professional is valid in implementing the electronic signature on the electronic document through the above process, it may be guaranteed that the sealed document is not modified, and the electronic signature may be recorded for reference and follow-up in the further.

Figure 6:
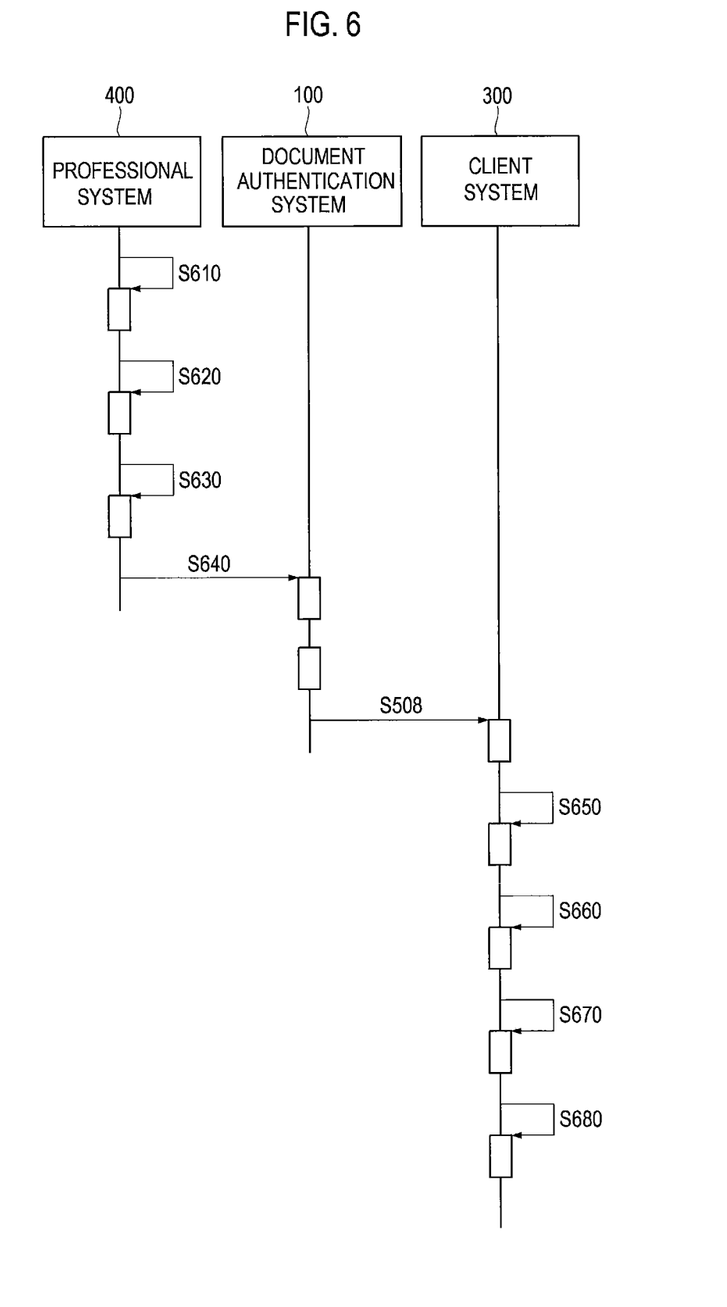
FIG. 6 is a schematic diagram showing an illustrative embodiment of a procedure of implementing the electronic signature and executing the output program.

Hereinafter, a procedure of executing the electronic signature program in the professional system 400 and the output program in the client system 300 will be described in detail with reference to FIG. 6. FIG. 6 is a schematic diagram showing a procedure of implementing the electronic signature and executing the output program. In one embodiment, the electronic signature program may be executed in the electronic signature control unit 440 for implementing the electronic signature on the electronic document. The output program may be executed to print out the electronic document and the seal imprint image thereon in the electronic document control unit 350.

Referring to FIG. 6, the electronic signature program may be executed in the electronic signature control unit 440 to verify whether the license of the professional is valid at S610 and compute Hash values of the electronic document at S620. The electronic signature program may be further executed to encrypt the hash values and the seal imprint image with a professional private key at S630.

Thereafter, the electronic signature program may be further executed to transmit the encrypted Hash values and seal imprint to the document authentication system 100 to be stored therein at S640. Also, the electronic document may be transmitted together with the hash values.

The output program may be executed in the electronic document control unit 350 to receive the encrypted hash values and seal imprint image at S508. Also, the electronic document may be received together with the hash values.

Subsequently, the output program may be further executed to check the license of the professional at S650 and decrypted the hash values and the seal imprint image at S660. The output program may be further executed to compare the hash values of the electronic document with the decrypted hash values at S670. If the hash values of the electronic document are matched with the decrypted hash values, the output program may be further executed to output the seal imprint image on the electronic document to thereby print out the electronic document with the seal imprint image thereon at S680.

In one embodiment, the electronic signature program and the output program may be previously stored in the professional system 400 and the client system 300, respectively, to be executed therein. In another embodiment, the electronic signature program and the output program may be downloaded from the electronic document authentication system and then executed in the professional system 400 and the client system 300 according to the necessity.

Figure 7:
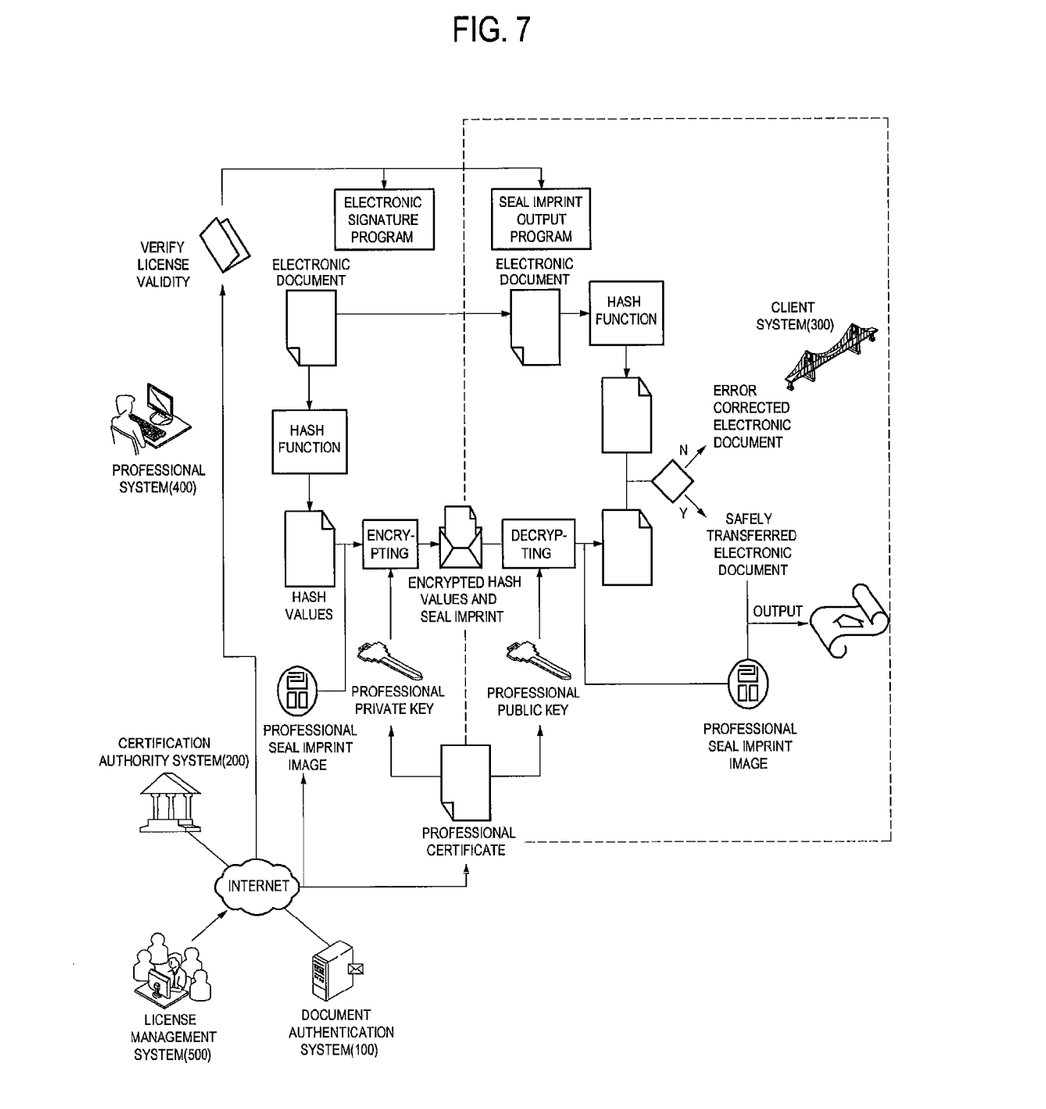
FIG. 7 is a schematic diagram showing an example of execution of an electronic signature implementing program and an output program.

The electronic signature and the electronic document output will be described in detail with reference to FIG. 7. FIG. 7 is a schematic diagram showing procedures of execution of the electronic signature program and the output program. Referring to FIG. 7, the hash values are assigned to the electronic document by using a hash function. The hash values and the seal imprint image may be encrypted using the professional private key. The encrypted hash values and the seal imprint image may be transmitted to the client system 300 through the authentication system 100.

The output program may be executed in the client system 300 to calculate hash values of the electronic document by using the hash function and compare the decrypted hash values with the extracted hash values of the electronic document. If the hash values are matched with each other, the electronic document may be printed out with the seal imprint image of the professional. On the contrary, if the electronic document is modified or the hash values are not matched, the electronic document may not be printed out.

As mentioned above, in one embodiment, since the seal imprint and the hash values are encrypted and separately transmitted in addition to the electronic document and the authentication information, the electronic document can be printed out with the dedicated output program, and the modification of the electronic document cannot be allowed through the comparison of the hash values of the electronic document and the seal imprint, the security may be intensified.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A document authentication system comprising:
one or more processors; and
one or more computer readable media storing computer executable instructions which when executed by the one or more processors perform a method for adding an electronic version of a human signature to an electronic document, the method comprising:
receiving a request from a client computer system, the request including an electronic document and an identification of a professional that is requested to provide a signature on the electronic document;
sending the electronic document to a computer system accessible to the professional and a request that the professional provide an electronic version of the professional's signature;
receiving the electronic version of the professional's signature from the computer system accessible to the professional;
sending the electronic version of the professional's signature to a license management computer system requesting that the license management computer system use the professional's signature to verify that the professional has a valid license that authorizes the professional to sign the electronic document;
receiving confirmation from the license management computer system that the professional has a valid license;
adding the electronic version of the professional's signature to the electronic document such that the professional's signature is visible when the electronic document is viewed;
sending the electronic version of the document with the electronic version of the professional's signature to the client computer system, wherein the computer executable instructions, when executed, further perform: enveloping the professional's signature with at least one of a seal imprint image, an identification, and a license number of the professional, wherein the enveloped professional's signature is sent to the license management computer system, and wherein receiving confirmation from the license management computer system that the professional has a valid license comprises receiving confirmation that the seal imprint image, the identification, the license number, and the professional's signature each correspond to a professional with a valid license; and
outputting, at the client computer system, the electronic document with the seal imprint image thereon in response to determining that the seal imprint image matches with the electronic document.

2. The document authentication system of claim 1, wherein the computer executable instructions, when executed, further perform:
encrypting the electronic document and the electronic version of the professional's signature so as to prevent reuse thereof.

3. A method, performed by a document authentication computer system, for adding an electronic version of a signature to an electronic document, the method comprising:
receiving, by the document authentication computer system, a request from a client computer system, the request including an electronic document and an identification of a professional that is requested to provide a signature on the electronic document;
sending, by the document authentication computer system, the electronic document to a computer system accessible to the professional and a request that the professional provide an electronic version of the professional's signature;
receiving, by the document authentication computer system, the electronic version of the professional's signature from the computer system accessible to the professional;
sending, by the document authentication computer system, the electronic version of the professional's signature to a license management computer system requesting that the license management computer system use the professional's signature to verify that the professional has a valid license that authorizes the professional to sign the electronic document;

receiving, by the document authentication computer system, confirmation from the license management computer system that the professional has a valid license;

adding, by the document authentication computer system, the electronic version of the professional's signature to the electronic document such that the professional's signature is visible when the electronic document is viewed;

sending, by the document authentication computer system, the electronic version of the document with the electronic version of the professional's signature to the client computer system;

enveloping, by the document authentication computer system, the professional's signature with at least one of a seal imprint image, an identification, and a license number of the professional, wherein the enveloped professional's signature is sent to the license management computer system, and wherein receiving confirmation from the license management computer system that the professional has a valid license comprises receiving confirmation that the seal imprint image, the identification, the license number, and the professional's signature each correspond to a professional with a valid license; and outputting, at the client computer system, the electronic document with the seal imprint image thereon in response to determining that the seal imprint image matches with the electronic document.

4. One or more non-transitory computer readable media storing computer executable instructions which when executed by one or more processors perform a method on a document authentication system for adding an electronic version of a signature to an electronic document, the method comprising:

receiving a request from a client computer system, the request including an electronic document and an identification of a professional that is requested to provide a signature on the electronic document;

sending the electronic document to a computer system accessible to the professional and a request that the professional provide an electronic version of the professional's signature;

receiving the electronic version of the professional's signature from the computer system accessible to the professional;

sending the electronic version of the professional's signature to a license management computer system requesting that the license management computer system use the professional's signature to verify that the professional has a valid license that authorizes the professional to sign the electronic document;

receiving confirmation from the license management computer system that the professional has a valid license;

adding the electronic version of the professional's signature to the electronic document such that the professional's signature is visible when the electronic document is viewed;

sending the electronic version of the document with the electronic version of the professional's signature to the client computer system;

enveloping the professional's signature with at least one of a seal imprint image, an identification, and a license number of the professional, wherein the enveloped professional's signature is sent to the license management computer system, and wherein receiving confirmation from the license management computer system that the professional has a valid license comprises receiving confirmation that the seal imprint image, the identification, the license number, and the professional's signature each correspond to a professional with a valid license; and outputting, at the client computer system, the electronic document with the seal imprint image thereon in response to determining that the seal imprint image matches with the electronic document.

5. The system of claim 1, wherein the professional's signature comprises:

the professional's handwritten signature; or the professional's seal.

6. The method of claim 3, wherein the professional's signature comprises:

the professional's handwritten signature; or the professional's seal.

7. The one or more computer readable media of claim 4, wherein the professional's signature comprises:

the professional's handwritten signature; or the professional's seal.

* * * * *